(12) United States Patent
Kao

(10) Patent No.: US 9,636,624 B2
(45) Date of Patent: May 2, 2017

(54) OXYGEN GENERATOR

(71) Applicant: Ta Hai Kao, Tainan (TW)

(72) Inventor: Ta Hai Kao, Tainan (TW)

( * ) Notice: Subject to any disclaimer, the term of this patent is extended or adjusted under 35 U.S.C. 154(b) by 0 days.

(21) Appl. No.: 14/698,893

(22) Filed: Apr. 29, 2015

(65) Prior Publication Data

US 2016/0317966 A1    Nov. 3, 2016

(51) Int. Cl.
*B01D 53/02* (2006.01)
*B01D 53/04* (2006.01)

(52) U.S. Cl.
CPC .... *B01D 53/0407* (2013.01); *B01D 2253/116* (2013.01); *B01D 2256/12* (2013.01); *B01D 2257/102* (2013.01); *B01D 2259/4533* (2013.01)

(58) Field of Classification Search
CPC .......... B01D 2256/12; B01D 2257/102; B01D 2259/402; B01D 2259/4533; B01D 53/0415
See application file for complete search history.

(56) References Cited

U.S. PATENT DOCUMENTS

| | | | | |
|---|---|---|---|---|
| 3,922,149 A | * | 11/1975 | Ruder | B01D 53/0454 95/130 |
| 4,869,733 A | * | 9/1989 | Stanford | B01D 53/04 95/138 |
| 5,922,178 A | * | 7/1999 | Isenberg | B01D 53/00 204/241 |
| 5,928,610 A | * | 7/1999 | Moran | B01D 53/053 422/120 |
| 7,976,617 B2 | | 7/2011 | Kao | |
| 7,998,256 B2 | | 8/2011 | Kao | |

* cited by examiner

*Primary Examiner* — Christopher P Jones
(74) *Attorney, Agent, or Firm* — Alan D. Kamrath; Kamrath IP Lawfirm, P.A.

(57) ABSTRACT

An oxygen generator, including an upper casing, a base and a lower casing, has a large opening on both sides of the base for installing a molecule tube whose upper and lower plugs are inserted and positioned into engaging slots of the upper and lower casings respectively. An air pump is installed at the bottom of the lower casing and has a motor to drive a cam to drive high-pressure air into the molecule tube through a flow channel and the lower plug of the lower casing. High-pressure oxygen produced after the action of the molecular sieve material passes through flow channels inside the upper plug and the upper casing and remains in the oxygen storage tank. During use, high-pressure oxygen is outputted from an oxygen output regulating valve, converted by an oxygen output solenoid valve, and discharged from a locking slot of the upper casing. The molecule tubes on both sides complement each other through the oxygen re-supplying solenoid valve of the upper casing and an oxygen re-supplying passage of the upper casing of the molecule tube.

8 Claims, 14 Drawing Sheets

FIG. 5

OXYGEN GENERATOR

BACKGROUND OF THE INVENTION

Field of the Invention

The present invention relates to an oxygen generator and, more particularly, to the oxygen generator having the features of a novel assembly structure, a tight installation space, being convenient to carry or transport, and a low overall cost and selling price.

Description of the Related Art

With the development of human society and civilization and as various aspects of medical technologies advance, we have significant improvements on the research and control of diseases, so that our average life expectancy increases accordingly, and the advent of an ageing society is inevitable. Meanwhile, the long life expectancy is also associated with many negative effects, and the severe damage to the global environment is mostly criticized among these negative effects. Also, human beings sometimes suffer from the counterattack of inexplicable diseases (such as SARS) or harsh environmental conditions (such as storms, blistering cold or heat, and mudslides), and the causes and reasons of these phenomena deserve serious contemplation. Since the external environment is in a worrying situation, we should keep up the momentum of all preparatory work to cope with the increasingly harsher environment and inexplicable diseases. Oxygen is a gas indispensible to the survival of human beings, so that an oxygen generator filled with a molecular sieve material and passing high-pressure air through the molecular sieve material to generate oxygen is an important apparatus for rescue and life saving. Besides emergency use, the oxygen generator is often used for controlling the symptoms of chronic diseases such as asthma and breathing disorders, and it is necessary for these patients to prepare for the use of the oxygen generator anytime. Since inhaling more pure oxygen has the effects of promoting blood circulation, maintaining our mind sober, eliminating fatigue, and improving work efficiency effectively, it is a good lifestyle to prepare the oxygen generator readily and conveniently used in our daily life and at work.

To improve oxygen generators as disclosed in U.S. Pat. Nos. 7,976,617 and 7,998,256 an oxygen generator is provided with an overall tight, compact, light, and portable design in accordance with the present invention.

SUMMARY OF THE INVENTION

Therefore, it is a primary objective of the present invention to provide an oxygen generator with an overall tight, compact, light, and portable design.

The objective of the present invention is to provide an oxygen generator comprising:

an upper casing having a plurality of installing perforations formed around the periphery of the upper casing, and provided for passing a corresponding quantity of engaging members respectively;

an installing perforation, disposed proximate to the middle of the upper casing, for passing a long locking member;

two large circular seats, disposed at the bottom, and having a bottom edge coupled to an air-sealing gasket, with each large circular seat having an engaging slot formed therein, and with an upwardly oriented exit inwardly communicated with a first channel, such that when the first channel is communicated with the rear side of the upper casing, an air inlet is passed downwardly to the outside;

a concave circular groove, formed at the bottom of the upper casing, disposed between the two large circular seats and proximate to the rear side, and for plugging an air-sealing gasket therein, with the concave circular groove having a through hole formed at the top of the concave circular groove and an airway upwardly passing out from the through hole and backwardly extending and passing out from a through hole;

a locking slot, formed at the top of the upper casing, and downwardly penetrating into a depth and passing out from an airway at the position proximate to the bottom, and then backwardly extended out from a through hole;

an air inlet hole formed and penetrating from top to bottom through the upper casing;

an oxygen output solenoid valve installed on the upper casing and disposed between the through hole of the air outlet channel communicated with the through hole formed at the top of the concave circular groove of the upper casing and a through hole of the air outlet channel communicated with the locking slot, such that when the oxygen output solenoid valve is opened, the through hole of the air outlet channel communicated with the through hole formed at the top of the concave circular groove of the upper casing is interconnected to the through hole of the air outlet channel communicated with the locking slot;

a base having a top area and a bottom area, with a plurality of large perforations formed in the top area, and with the center of the plurality of large perforations corresponsive to the center of the engaging slot, with a plurality of large perforations formed in the bottom area, with the center of the plurality of large perforations formed in the bottom area corresponsive to the center of the engaging slot, with the range between the top area and the bottom area and corresponsive to the plurality of large perforations and a portion of the periphery being a large opening, with only the range between the plurality of large perforations formed in the top and bottom areas coupled by the front wall, the rear wall and the middle connecting column, with the periphery of the top area having an engaging hole configured to be corresponsive to the installing perforation of the upper casing for passing and securing the engaging member of the upper casing into the engaging hole when the upper casing is covered onto the top area, with the periphery of the bottom area having an engaging hole, with the connecting column having an installing through slot formed and longitudinally penetrated through the connecting column;

an air intake tank, an air release silencing barrel and an installation space divided into an upper position and a lower position, and an oxygen storage tank, with the installing through slot provided for passing the long locking member of the upper casing; with the air intake tank configured to be corresponsive to the air inlet hole; with the air release silencing barrel provided for discharging and buffering air therein; with the installation space opened upwardly and having a through hole formed at the rear side and penetrated through the rear wall; with the oxygen storage tank opened downwardly, with the top of the oxygen storage tank blocked and sealed by the oxygen output regulating valve, so that oxygen is outputted from the oxygen output regulating valve; with the top of the top area having a through hole configured to be corresponsive to a position of each air inlet of the upper casing and penetrated downwardly into the rear wall, with each through hole being a longitudinal channel, with the bottom communicated with a transverse channel, and with the middle passed into the oxygen storage tank;

an oxygen output regulating valve attached closely into the installation space, with an adjusting knob aligned precisely and passed through the through hole of the rear wall of the installation space;

a lower casing having a plurality of installing perforations formed around the periphery of the lower casing for passing an equal amount of engaging members one by one respectively; with an installing perforation formed at a position proximate to the middle of the lower casing for passing the long locking member; with two large circular seats [M] disposed at the top of the lower casing, with the top of the large circular Death seats being coupled to an air-sealing gasket, with each large circular seat having an engaging slot formed therein, with a downwardly formed exit communicated with a downwardly formed through hole, with the through hole having a third channel communicated with the downwardly formed through hole, with another through hole extended to a side of the lower casing and communicated with a downwardly extended engaging base; with another downwardly formed through hole passing out from the engaging slot and interconnecting a fourth channel and passing out from another through hole, with another through hole passing through the fourth channel also having a similar through hole formed at a proximate position and passed into an air release channel, with an air release opening formed at the rear of the air release channel corresponsive to the air release silencing barrel of the base; with a connecting base formed at the bottom of the lower casing and having a range covering the installing perforation and an air outlet hole; with the top of the lower casing having a non-penetrating slightly concave groove formed between the air release channels and disposed proximate to the rear side for plugging an air-sealing gasket; so that during assembling, the lower casing is attached onto the bottom area of the base, and the installing perforation of the lower casing is attached to the installing through slot of the base, such that the long locking member passing through the installing through slot passes through the installing perforation of the lower casing; with the air outlet hole of the lower casing being attached to the air intake tank; with the air release silencing barrel of the base precisely enclosing and covering the air release channel and the air release opening exposed from the lower casing; with the bottom edge of the oxygen storage tank of the base abutting the air-sealing gasket in the slightly concave groove, so that the bottom of the oxygen storage tank is air-tightly sealed; and with the engaging member passing into the installing perforation of the lower casing being installed and secured into the engaging hole of the base bottom area;

an air pump having a connecting base configured to be corresponsive to the connecting base of the lower casing, with the connecting base of the air pump having a locking hole and an air inlet hole formed therein, such that when the connecting base of the lower casing is embedded into the connecting base of the air pump, the locking hole is attached to the installing perforation in the connecting base on the bottom of the lower casing for passing and securing the long locking member that passes through the installing perforation of the lower casing; with the air inlet hole attached to the air outlet hole formed in the connecting base on the bottom of the lower casing; with each sides side of the air pump being inserted from an air outlet tube into the engaging base of the lower casing and communicated with the interconnected through hole; with the interior of the air pump sucking air through the air inlet hole and the air outlet hole and entering the air from the air inlet hole into the air intake tank by driving a cam by a motor, with the cam operated to compress the air, and with air pressure being sent sequentially at different times to the air outlet tubes on both sides and through the engaging base, and entering from the interconnected through hole into the third channel of the lower casing;

a gas intake solenoid valve installed at the bottom of the lower casing, and disposed between the through hole downwardly passing through the third channel and the through hole downwardly passing out from the engaging slot of the lower casing, so that when the air pump is turned on, the through hole downwardly passing out from the third channel is communicated with the through hole downwardly passing out from the engaging slot of the lower casing, and so that high-pressure air rushes upwardly out from the exit communicated with the engaging slot;

an air release solenoid valve installed at the bottom of the lower casing, and disposed between the fourth channel and the air release channel, such that when the gas intake solenoid valve is closed, high-pressure gas at the exit of the engaging slot downwardly passes out from the through hole to enter into the fourth channel and reach another through hole, and when the air release solenoid valve is opened, the gas in the fourth channel is transferred into the air release channel and discharged from air release opening into the air release silencing barrel of the base; and a molecule tube being a longitudinal cylindrical body filled with a molecular sieve material, and having an upper casing and a lower casing, with an airtight plastic strip embedded into the external periphery of each of the upper casing and the lower casing for sealing air when the airtight plastic strip is latched securely to the top and bottom of the molecule tube; with the middle of the exterior of the upper casing being tapered to form an upper plug, with the airtight plastic strip embedded into the external periphery of the upper plug, with the upper casing having an umbrella shaped non-return rubber plate inserted into the middle of the range of the upper plug, with a passage formed within a range covering the umbrella shaped non-return rubber plate and penetrated through the upper casing; with the middle of the exterior of the lower casing being tapered to form a lower plug with an airtight plastic strip embedded into the external periphery of the lower plug, with during assembling, the upper plug at the top of the molecule tube passing through one of the large perforations in the top area of the base and precisely aligned and plugged into the engaging slot of the upper casing, the bottom of the molecule tube being pushed into the large perforation corresponsive to the bottom area of the base, and the lower plug at the bottom being precisely aligned and plugged into the engaging slot of the lower casing, and with the assembling process completed, the upper plug at the top of the molecule tube provides an airtight effect between the airtight plastic strip embedded into the external periphery and the engaging slot, the outer edge of the top of the molecule tube abuts the air-sealing gasket connected to the bottom of the large circular seat of the upper casing to achieve the airtight effect, the lower plug of the molecule tube provides an airtight effect between the airtight plastic strip embedded into the external periphery and the engaging slot, and the outer edge of the molecule tube bottom abuts the air-sealing gasket connected to the large circular seat of the lower casing to achieve the airtight effect.

In the oxygen generator, the bottom of the upper casing is disposed in the large circular seat, and an exit is formed outside each of the engaging slots and communicated to a second channel. When the second channels on both sides are interconnected to the rear side of the upper casing, the second channels are passed backwardly to the outside from a through hole. An oxygen re-supplying solenoid valve is installed on the upper casing and disposed between the through holes backwardly communicated by the second channels on both sides, and an air re-supplying passage is formed on an upper casing of the molecule tube and corresponsive to a range outside the upper plug and penetrated through the upper casing. When the oxygen re-supplying solenoid valve is opened, the second channels on both sides are communicated with the backwardly interconnected through holes for re-supplying oxygen generated from oxygen generation to a molecule tube in which oxygen has not been generated yet.

In the oxygen generator, the base is an integrally formed object and has a heat sink outwardly and perpendicularly formed on the peripheral surface of the base.

In the oxygen generator, the molecule tube comprises: an upper casing filter fabric transversally disposed inside the upper casing and at a position with a small distance from the bottom of the upper casing; and a partition plate installed at a position proximate to the middle section of the upper casing for flowing a gas and having an airtight plastic strip embedded around the external periphery of the partition plate. An elastic member is installed at the top of the partition plate, and a partition plate filter fabric is transversally disposed at a position with a small distance from the bottom of the upper casing. The lower casing is provided for passing a gas, and a lower casing filter fabric is transversally disposed at the top of the lower casing and at a position with a small distance from the top of the lower casing. A molecular sieve material is filled into a space between the lower casing filter fabric and the partition plate filter fabric.

In the oxygen generator, when the high-pressure air enters into the molecule tube from the lower plug of the molecule tube, the high-pressure air passes through the molecular sieve material to produce high-pressure pure oxygen and flows upwardly to enter into an exit of the upper casing engaging slot through the upper plug of the molecule tube, then passes through the first channel to reach the air inlet, flows downwardly through the through hole to enter into the longitudinal channel, and flows along the transverse channel and into the oxygen storage tank for storage. The gas without passing through the molecular sieve material remains in the lower section inside the molecule tube. When the oxygen generation stops, the air at the lower section inside the molecule tube is transferred from the fourth channel to the air release channel by the operation of the air release solenoid valve and released from the air release opening into the air release silencing barrel of the base.

In the oxygen generator, the locking slot is provided for securing a tube joint of the oxygen tube.

In the oxygen generator, the upper and lower ends of the air intake tank are provided for filling a filter member.

BRIEF DESCRIPTION OF THE DRAWINGS

FIG. 5 is a perspective view of an upper casing of a preferred embodiment of the present invention;

DETAILED DESCRIPTION OF THE PREFERRED EMBODIMENTS

The technical characteristics, contents, advantages and effects of the present invention will be apparent with the detailed description of preferred embodiments accompanied with related drawings as follows.

Figure 1:
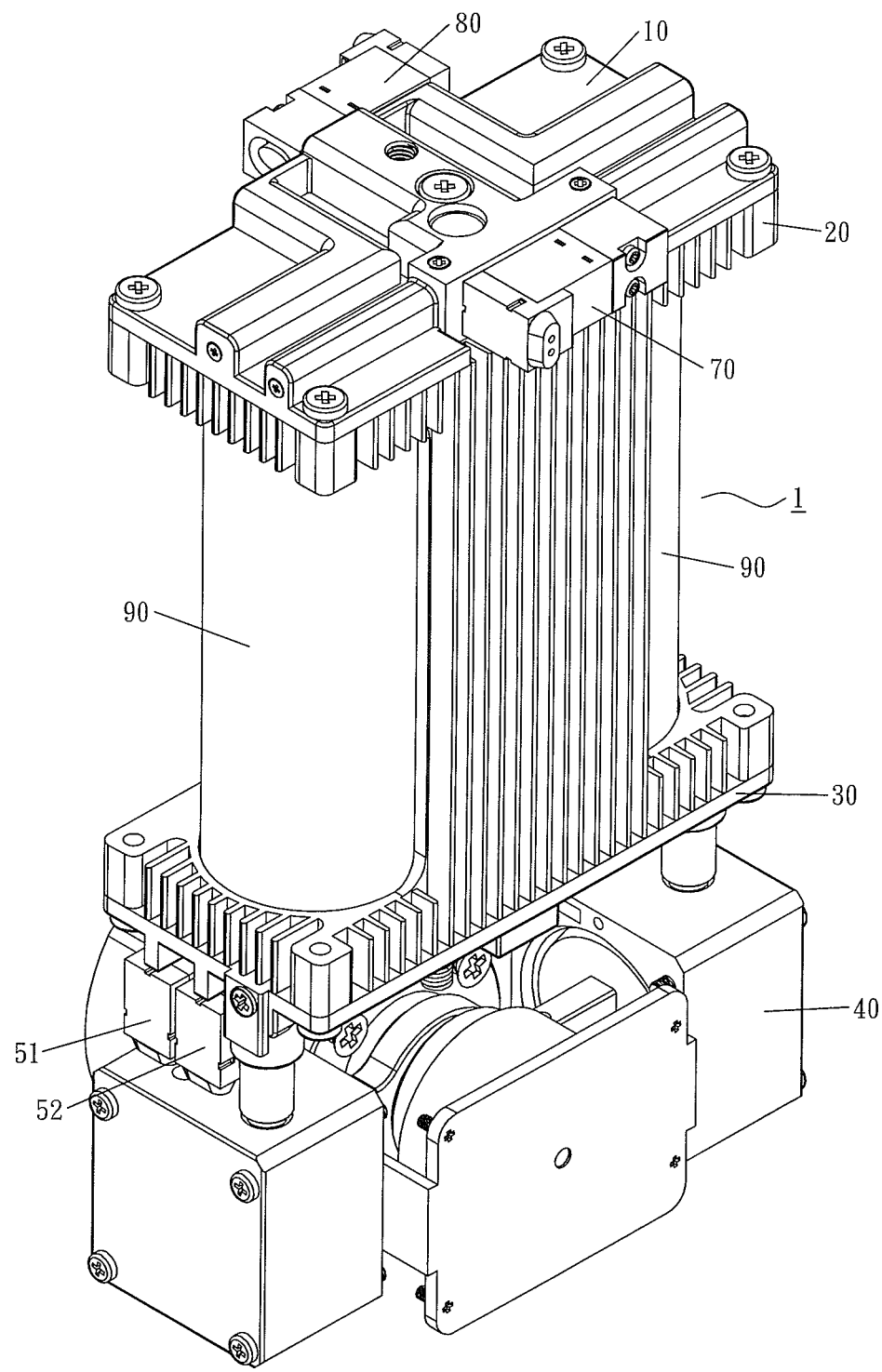
FIG. 1 is a perspective view of a preferred embodiment of the present invention.
Figure 2:
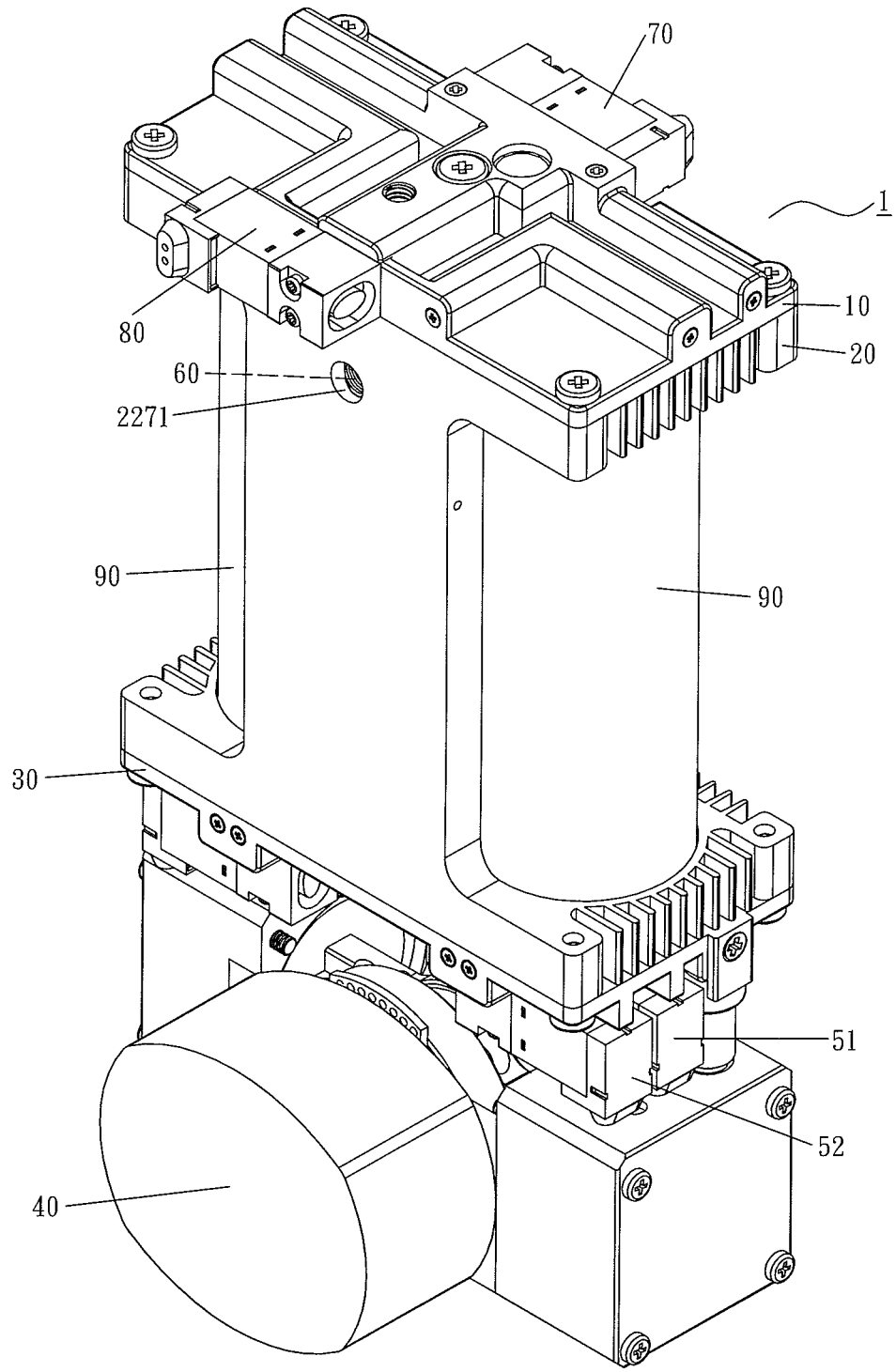
FIG. 2 is another perspective view of a preferred embodiment of the present invention viewing from a different angle.
Figure 3:
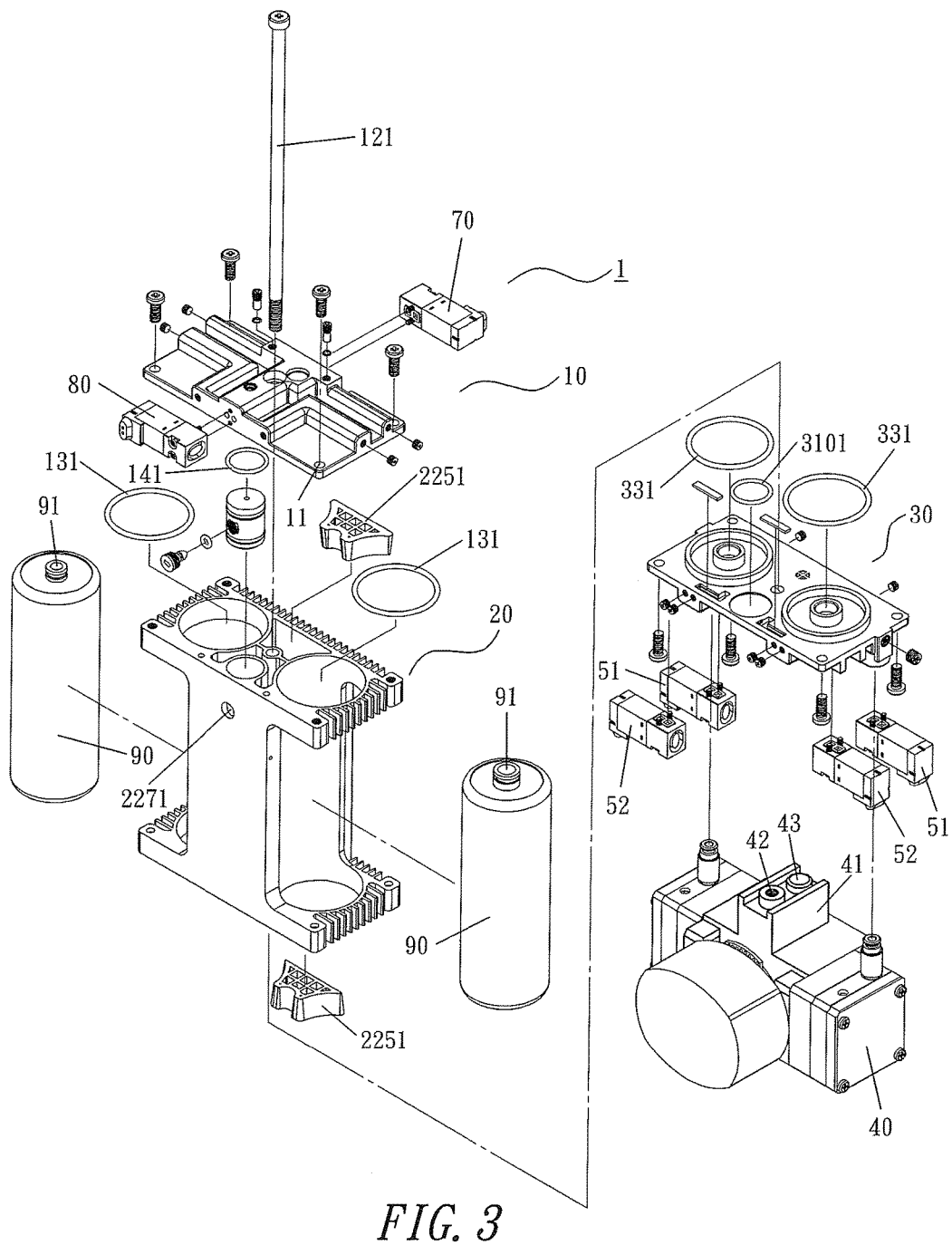
FIG. 3 is an exploded view of a preferred embodiment of the present invention.
Figure 4:
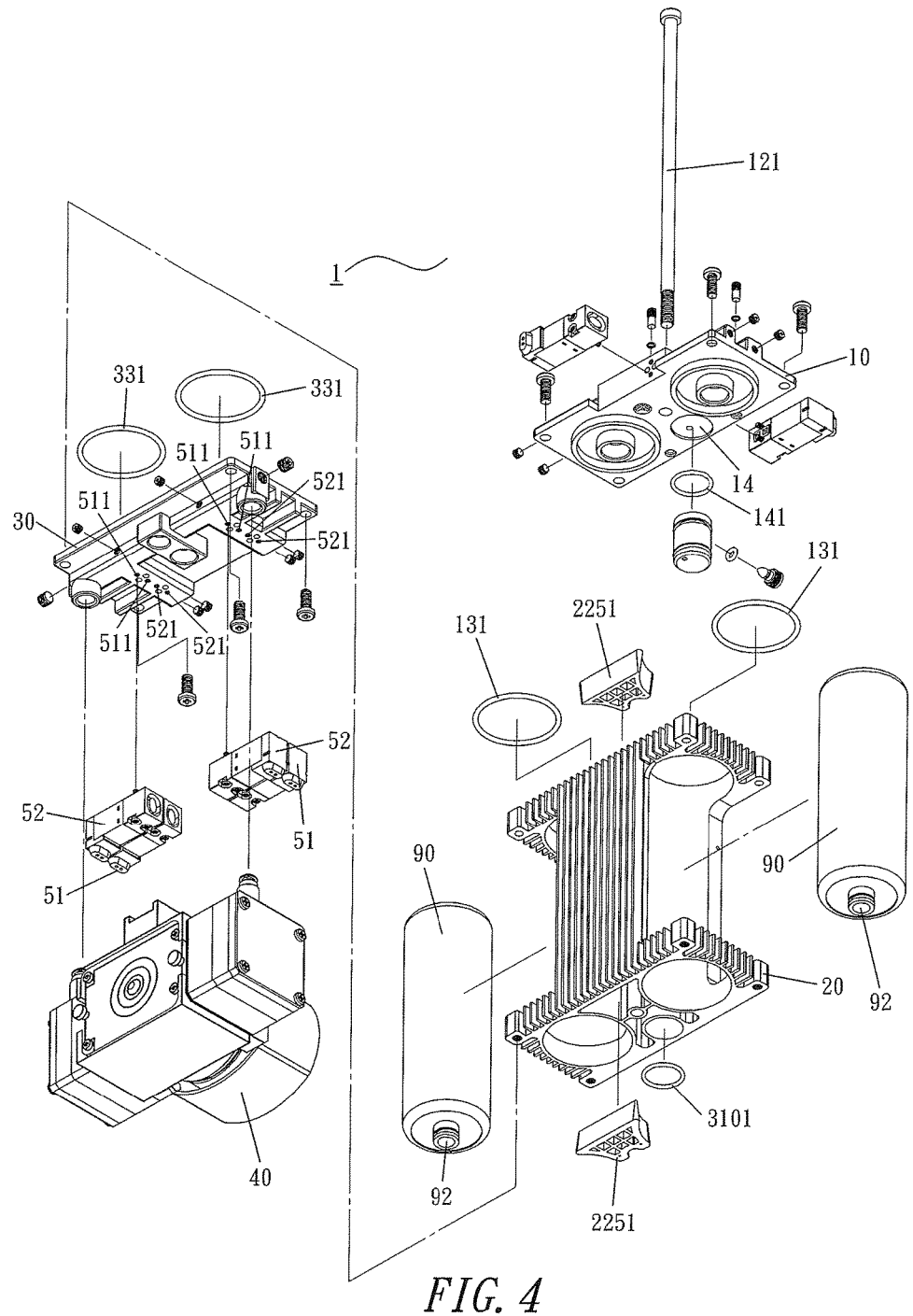
FIG. 4 is another exploded view of a preferred embodiment of the present invention viewing from a different angle.
Figure 5:
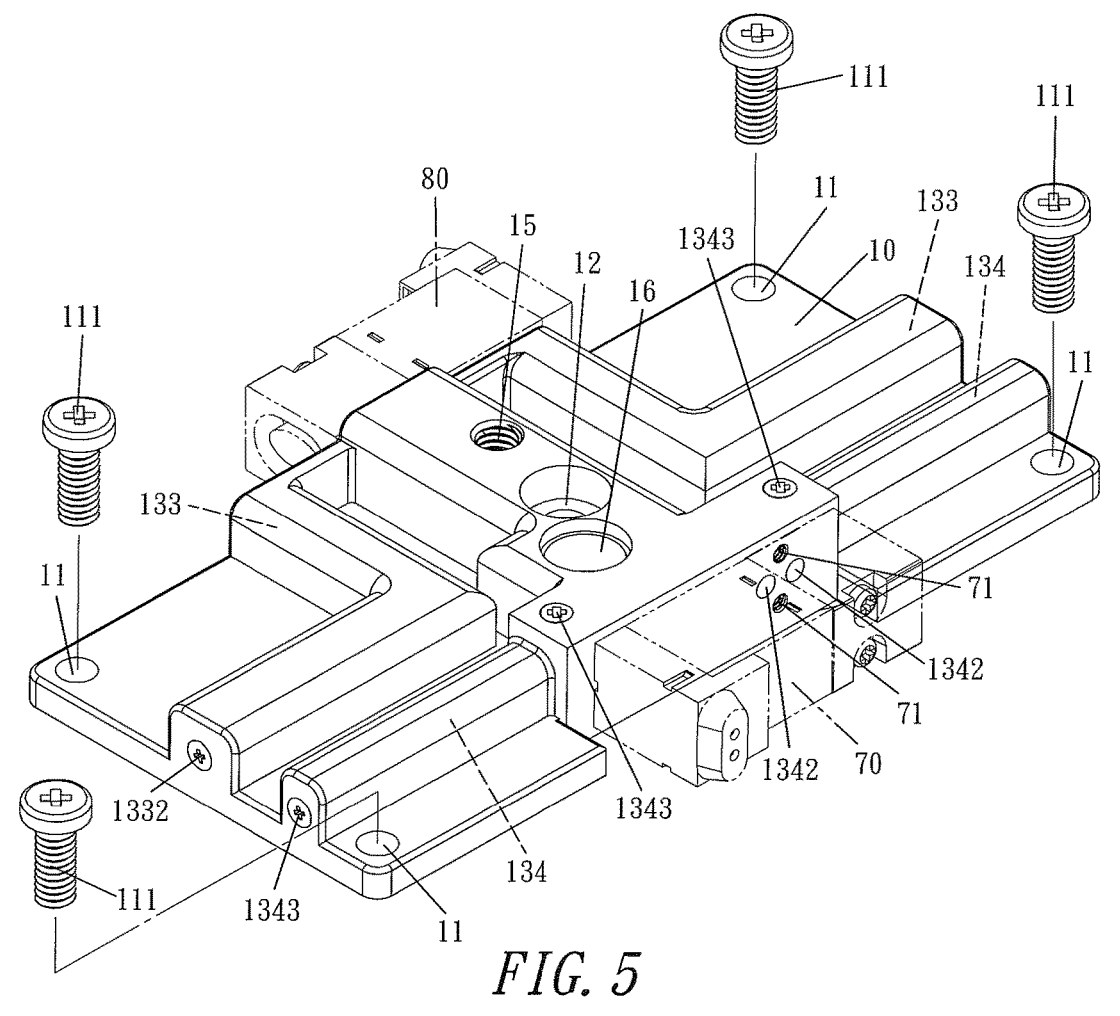
Figure 6:
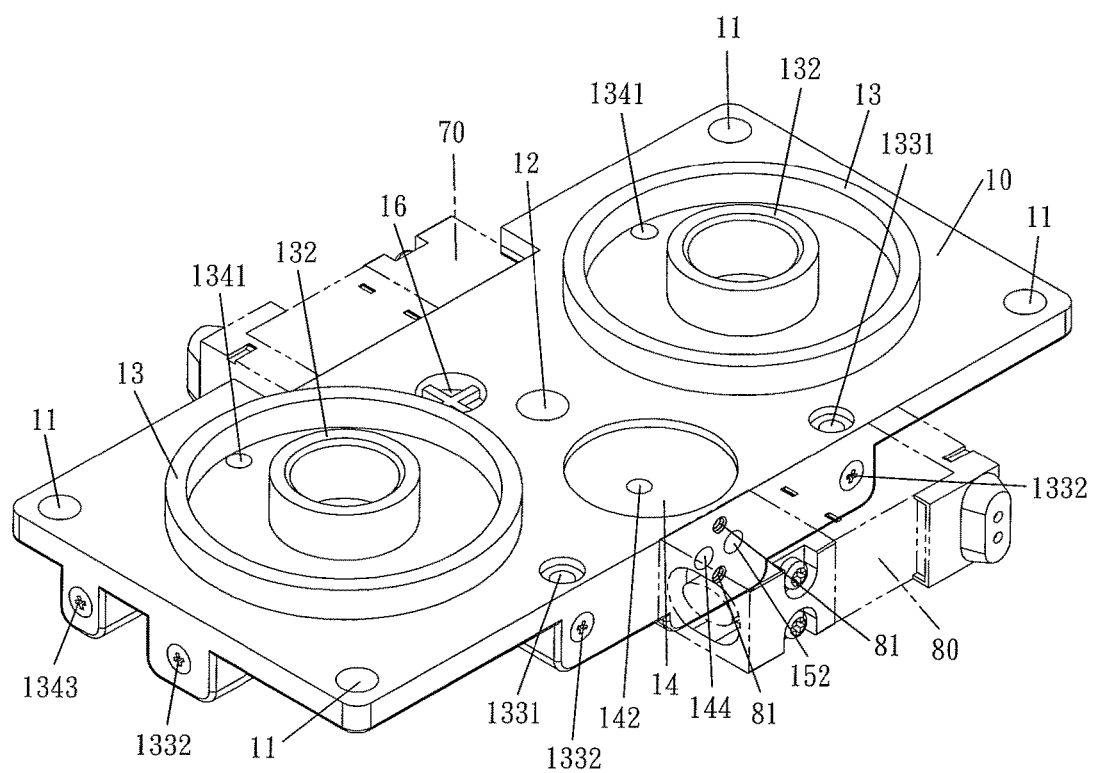
FIG. 6 is another perspective view of an upper casing of a preferred embodiment of the present invention viewing from a different angle.
Figure 7:
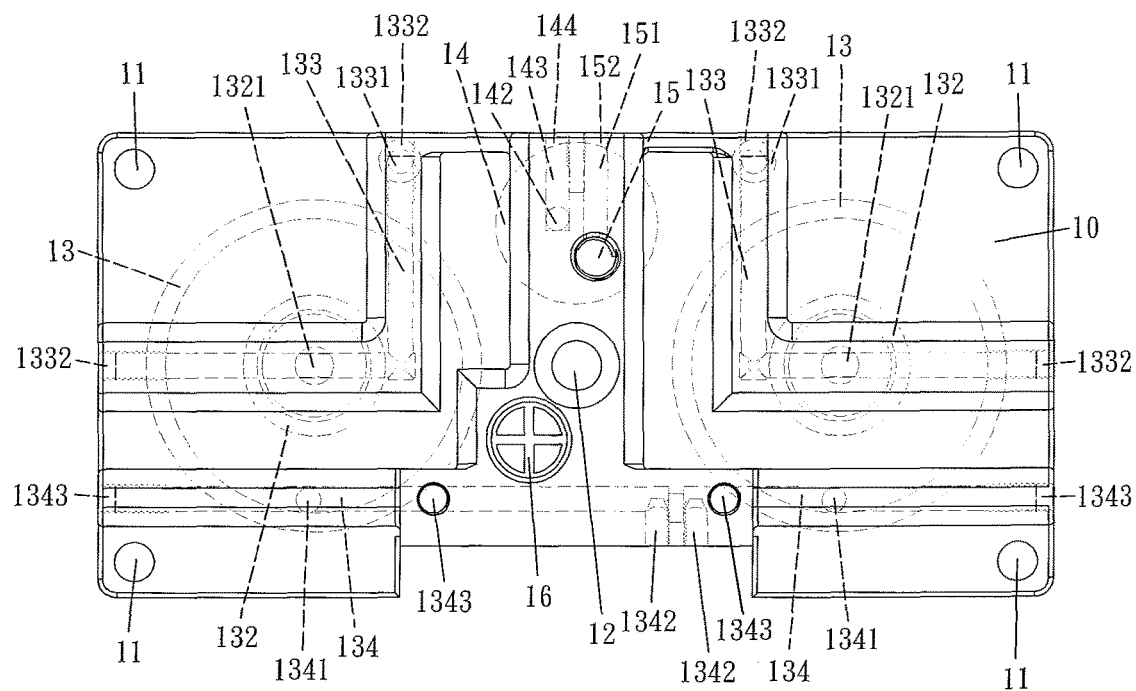
FIG. 7 is a bottom view of an upper casing of a preferred embodiment of the present invention.
Figure 13:
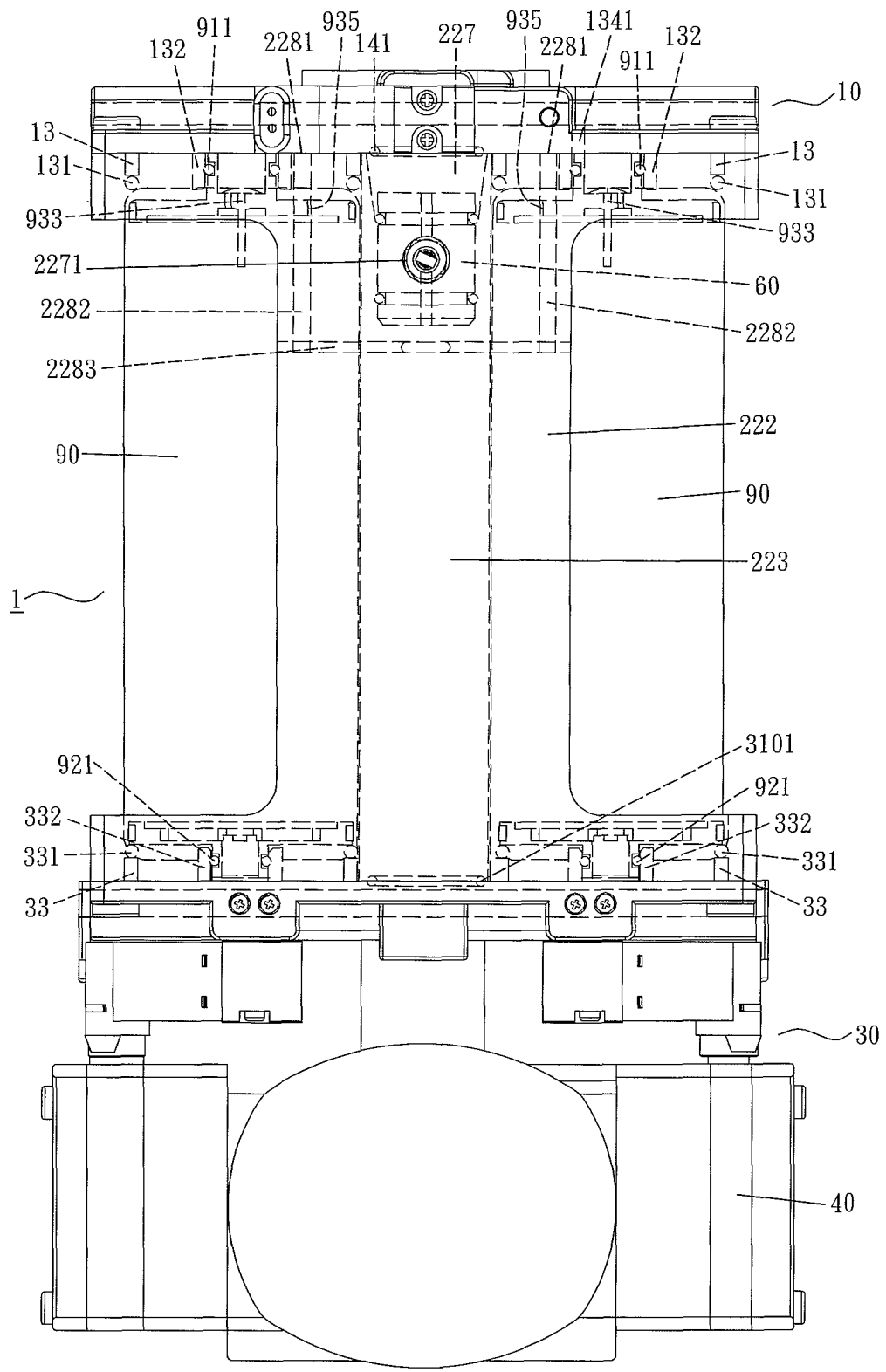
FIG. 13 is a rear view of the assembly of a preferred embodiment of the present invention.

With reference to FIGS. 1 to 4 for an oxygen generator 1 in accordance with a preferred embodiments embodiment of the present invention, the oxygen generator 1 comprises an upper casing 10, a base 20, a lower casing 30, an air pump 40, a set of gas intake solenoid valves 51, a set of air release solenoid valves 52, an oxygen output regulating valve 60, an oxygen re-supplying solenoid valve 70, an oxygen output solenoid valve 80 and a set of molecule tubes 90. The upper casing 10 is substantially a rectangular block as shown in FIGS. 5 to 7. The upper casing 10 has a plurality of installing perforations 11 formed around the periphery of the upper casing 10 and provided for passing a plurality of engaging members 111 (such as short bolts) with a quantity equal to that of the installing perforations respectively from top to bottom. The installing perforation 12 formed at a position near the middle is provided for passing a long locking member 121 (such as a long bolt as shown in FIGS. 3 and 4). Two large circular seats 13 are formed at the bottom (as shown in FIG. 6), and an air-sealing gasket 131 is coupled to the bottom edge of the large circular seat 13 (as shown in FIGS. 3 and 4). Each large circular seat 13 has an engaging slot 132 formed thereon, and an upwardly formed exit 1321 (as shown in FIG. 7) is inwardly communicated with a first channel 133 concealed in the upper casing 10. Thus, when the first channels 133 on both sides are interconnected to the rear side of the upper casing 10, the first channels 133 are downwardly passed from an air inlet 1331 to the outside (as shown in FIGS. 5 and 6). The formation of the first channel 133 requires drilling a plurality of openings to the outside and plugged by a plug member 1332 to achieve an airtight effect. In addition, a concave circular groove 14 is formed at the bottom of the upper casing 10 and between the two large circular seats 13 and disposed near the rear side for installing an air-sealing gasket 141 (as shown in FIGS. 3, 4 and 13). A through hole 142 formed at the top of the concave circular groove 14 and upwardly communicated with an airway 143 and a through hole 144 is formed and extended backwardly to the outside (as shown in FIGS. 6 and 7). A locking slot 15 is formed at the top of the upper casing 10 for securing a tube joint of an external oxygen tube (not shown in the figure). Since the locking slot 15 is situated at a protruding position, the locking slot 15 can be penetrated downwardly to a certain depth (to facilitate securing the tube joint), and a portion of the locking slot 15 near the bottom is backwardly interconnected to an airway 151 and extended backwardly from a through hole 152 to the outside (as shown in FIGS. 6 and 7). In this design, the through hole 152 is adjacent to the through hole 144, and both of the through hole 144 and the through hole 152 have two engaging holes 81 (such as screw holes) formed along the vertical line of the center line and provided for installing an oxygen output solenoid valve 80. When the oxygen output solenoid valve 80 is opened and operated, the gas in the through hole 144 is transferred from the oxygen output solenoid valve 80 into the through hole 152. Therefore, the through holes 144, 152 can be opened or closed by controlling the oxygen output solenoid valve 80. In addition, the upper casing 10 has an air inlet hole 16 formed thereon and penetrating from top to bottom, and the bottom of the upper casing 10 is disposed in the large circular seat 13. An exit 1341 formed outside each of the engaging slots 132 (as shown in FIGS. 6 and 7) is inwardly interconnected to a second channel 134 concealed in the upper casing 10. When the second channels 134 on both sides are communicated to the rear side of the upper casing 10, the second channel 134 is passed backwardly from a through hole 1342 (as shown in FIGS. 5 and 7) to the outside. Since the formation of the second channel 134 requires drilling a plurality of openings interconnected to the outside and plugged by a plug member 1343 to achieve the airtight effect. In this design, the two through holes 1342 are disposed adjacent to each other, and the two through holes 1342 have two engaging holes 71 (such as screw holes) formed along the vertical line of the center line and provided for installing an oxygen output solenoid valve 70. When the oxygen re-supplying solenoid valve 70 is opened and operated, the gas in the two through holes 1342 is connected, so that the two through holes 1342 can be opened or closed by controlling the oxygen re-supplying solenoid valve 70.

Figure 8:
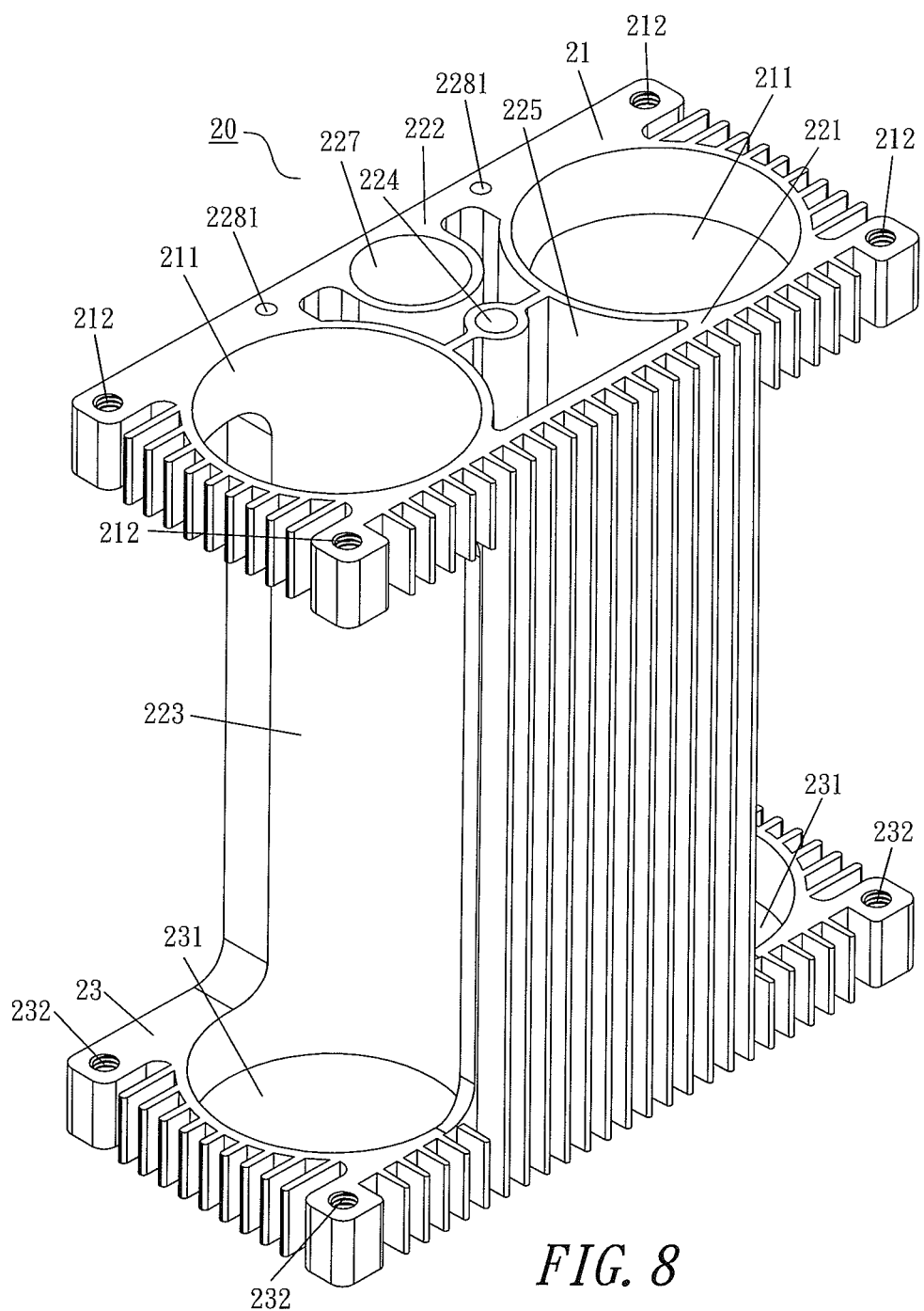
FIG. 8 is a perspective view of a base of a preferred embodiment of the present invention.
Figure 9:
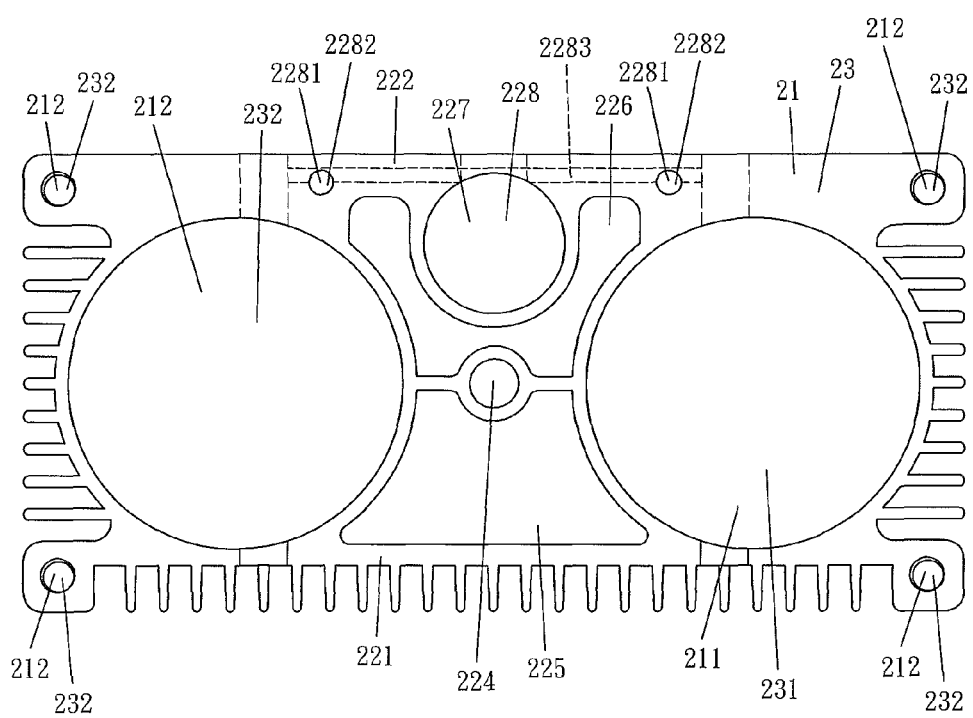
FIG. 9 is a top view of a base of a preferred embodiment of the present invention.

The base 20 is an integrally formed object (by aluminum extrusion) with a top area 21 and a bottom area 23 substantially equal to those of the upper casing 10. In FIGS. 8, 9 and 13, a large perforation 211 is formed in the top area 21, and the center of the large perforation 211 is configured to be corresponsive to the center of the engaging slot 13. A large perforation 231 is formed in the bottom area 23, and the center of the large perforation 231 is also the center of the large perforation 211. The portion between the top area 21 and the bottom area 23 and corresponsive to the large perforations 211, 231 and a part of the periphery are large openings, and the portion between the two large perforations 211, 231 is just connected by the integrally formed front and rear walls 221, 222 and middle connecting column 223. An engaging hole 212 (such as a screw hole) is formed around the periphery of the top area 21, such that when the upper casing 10 is covered onto the top area 21 of the base 20 during the assembling process, the engaging member 111 (such as a short bolt) is provided for securing the upper casing 10 (by screw connection). An engaging hole 232 (such as a screw hole) is formed around the periphery of each bottom area 23, and a heat sink is outwardly and perpendicularly formed on the surfaces of the periphery of the top area 21 and the bottom area 23 (such as both left and right sides and rear side) and the front wall 221 for assisting the heat dissipation of the oxygen generator 1. Further provided is an installing through slot 224 longitudinally penetrated through the connecting column 223, an installing through slot 224, an air intake tank 225, an air release silencing barrel 226, an installation space 227 divided into an upper position and a lower position, and an oxygen storage tank 228. The installing through slot 224 is provided for passing the long locking member 121 (such as a long bolt) of the upper casing 10. A filter member 2251 (such as a cotton filter as shown in FIGS. 3 and 4) is filled into the air inlet hole 16 of the air intake tank 225. The upper and lower ends of the air intake tank 225 are provided for insertion, and the air release silencing barrel 226 provides a relatively greater space provided for entering and containing a discharged gas having a pressure (which will be described in detail later) in order to buffer and eliminate pressure and provide a silencing effect. The installation space 227 is disposed at the top, and the oxygen storage tank 228 is disposed at the bottom. The installation space 227 is opened upwardly, and a through hole 2271 (as shown in FIGS. 3 and 13) formed at the rear side is penetrated through the rear wall 222. The size of the installation space 227 is designed to precisely and closely attach to an oxygen output regulating valve 60, and an adjusting knob is aligned precisely with the through hole 2271 (whose effect will be described later). The oxygen storage tank 228 is disposed at the bottom of the installation space 227, and the bottom is opened (which will be closed and sealed in later section), and the top is blocked and sealed by the oxygen output regulating valve 60. However, oxygen may be outputted from the oxygen output regulating valve 60 (whose effect will be described later). The oxygen storage tank 228 is provided for entering and storing oxygen, so that the intake channel has a through hole 2281 formed at the top of the top area 21 and at a position corresponsive to the air inlet 1331 of the upper casing 10 and downwardly passed into the rear wall 222. Each through hole 2281 is a longitudinal channel 2282. The bottom is interconnected to form a transverse channel 2283, and the middle is tangentially passed into the oxygen storage tank 228.

Figure 10:
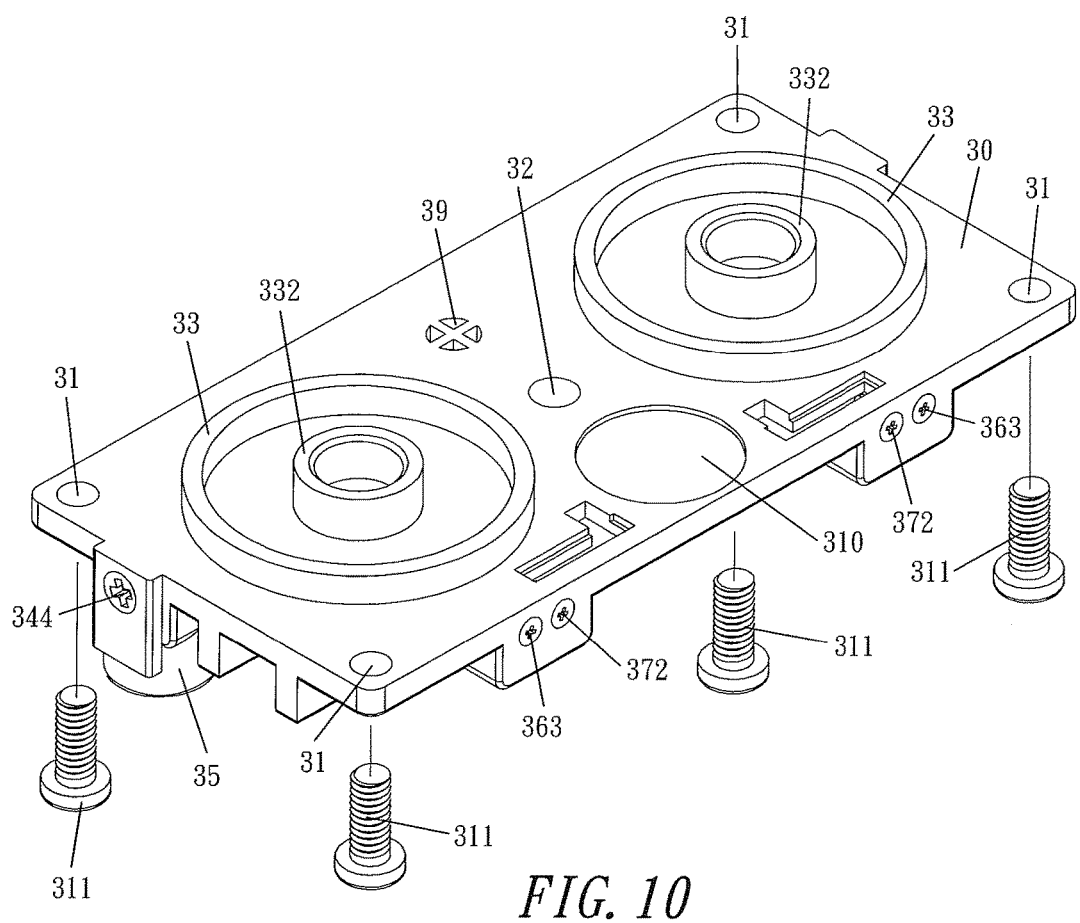
FIG. 10 is a perspective view of a lower casing of a preferred embodiment of the present invention.
Figure 11:
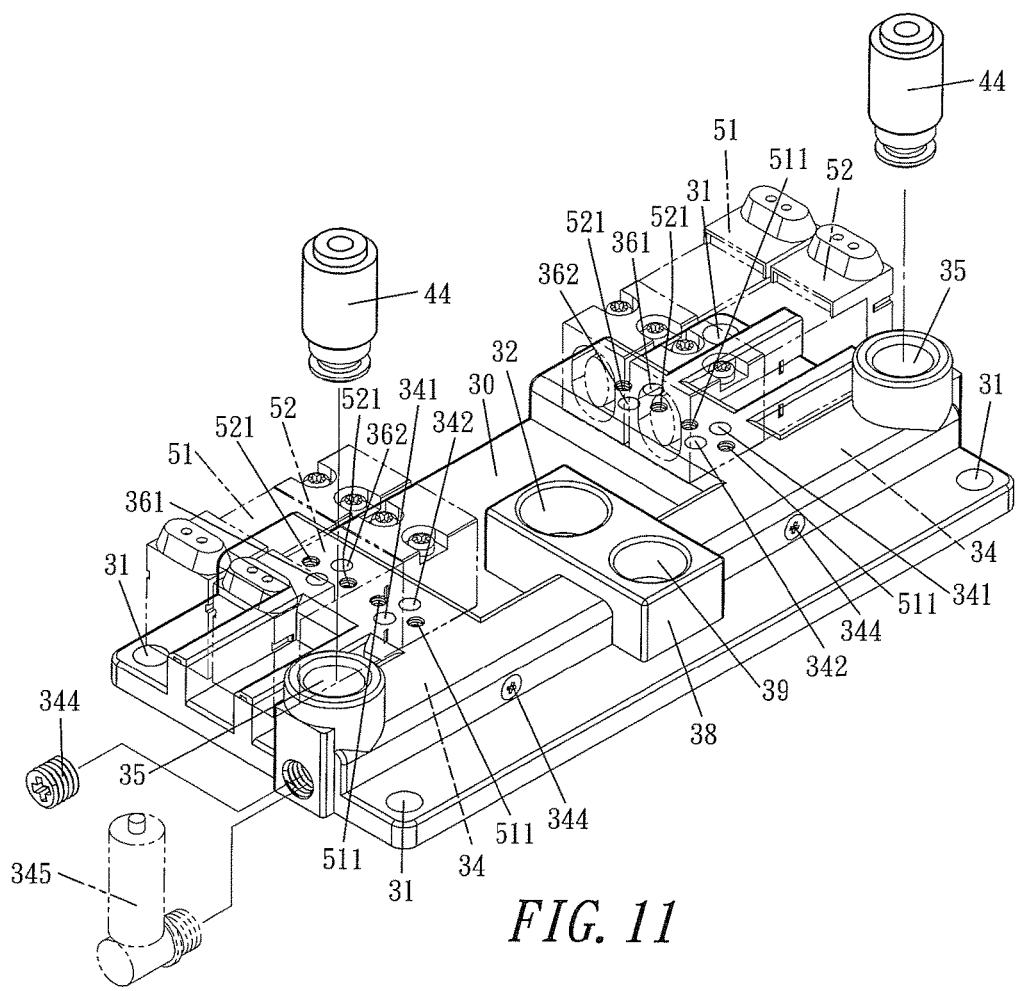
FIG. 11 is another perspective view of a lower casing of a preferred embodiment of the present invention viewing at a different angle.
Figure 12:
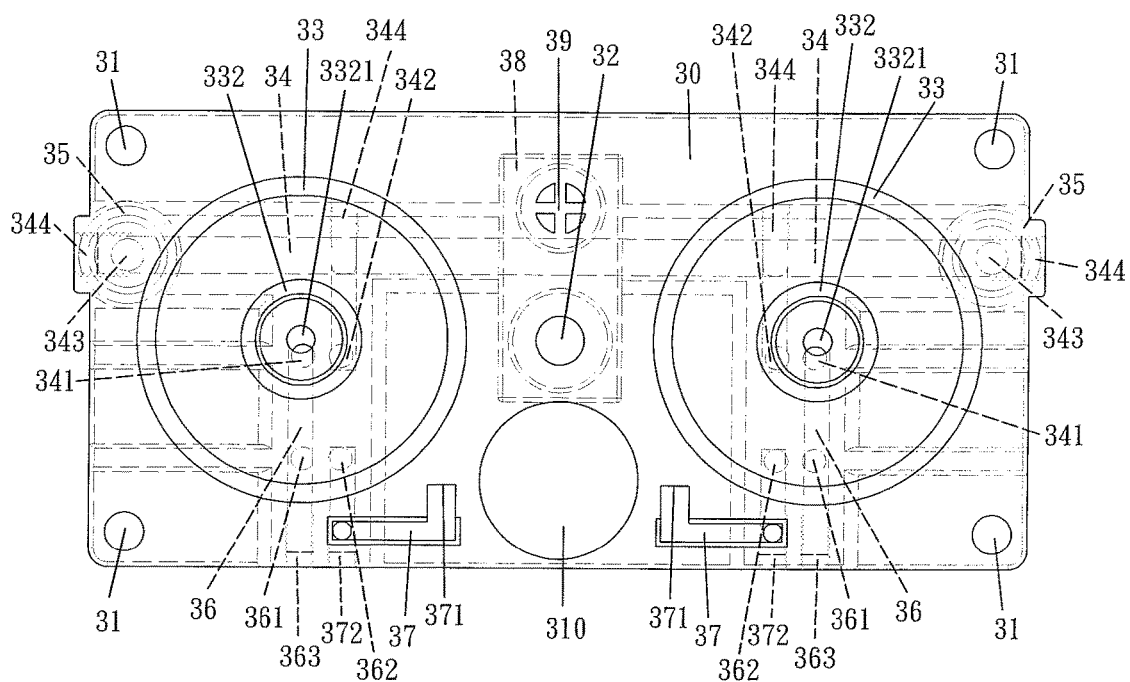
FIG. 12 is a top view of a lower casing of a preferred embodiment of the present invention.
Figure 14:
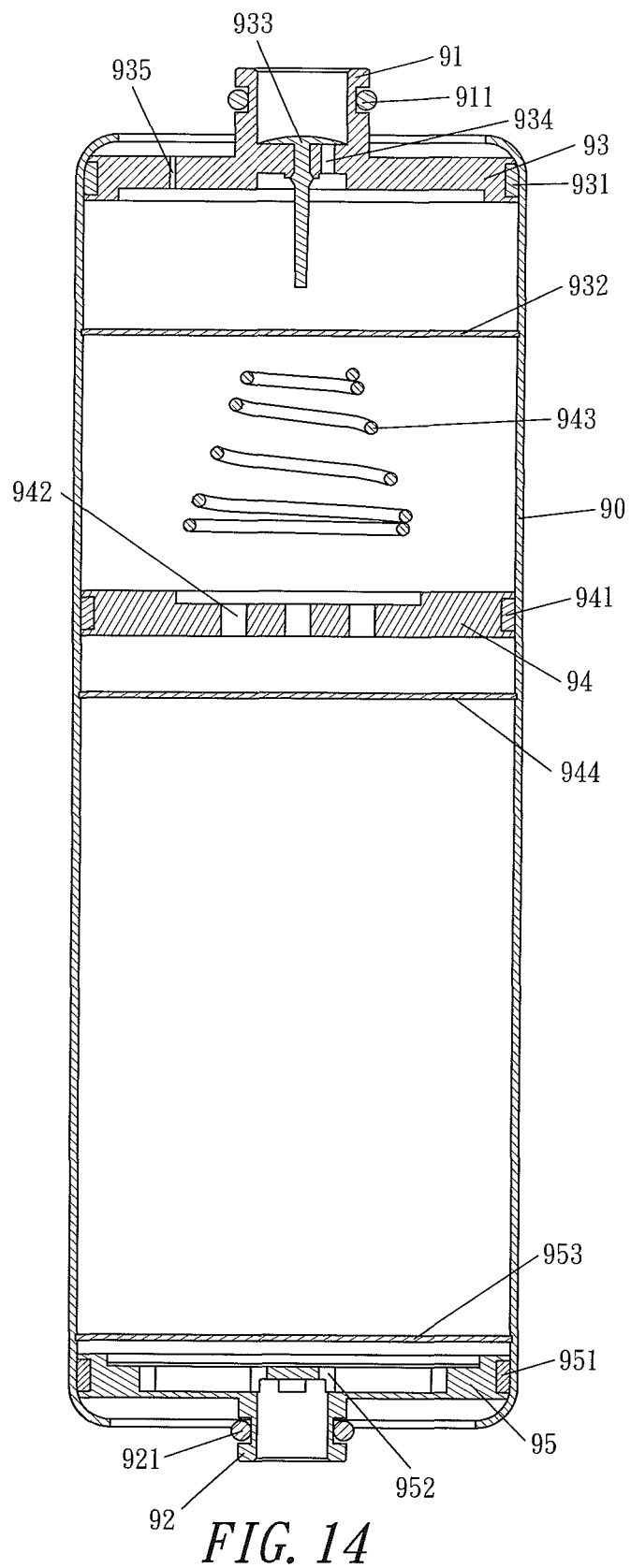
FIG. 14 is a schematic view of a molecule tube of a preferred embodiment of the present invention.

The lower casing 30 is substantially a rectangular block with an area corresponsive to the upper casing 10. With reference to FIGS. 10-12, the periphery of the lower casing 30 has a plurality of installing perforations 31 for passing a plurality of engaging members 311 (such as short bolts) one by one from top to bottom respectively. An installing perforation 32 is formed at a position proximate to the middle and provided for passing the long locking member 121 (such as a long bolt) two large circular seats 33 (as shown in FIG. 11) are formed at the top, and the top edge of the large circular seat 33 is coupled to an air-sealing gasket 331 (as shown in FIGS. 3, 4 and 13). Each large circular seat 33 has an engaging slot 332 formed therein, and a downward exit 3321 (as shown in FIG. 12) communicated with a downwardly passing through hole 341. The downwardly passing through hole 341 has another downwardly passing through hole 342 penetrating into a third channel 34 concealed in the lower casing 30, and the other through hole 343 passing to a side of the lower casing 30 and a downwardly extended engaging base 35 are communicated with each other. The through hole 341 is passed from a fourth channel 36 concealed in the lower casing 30 and out from another through hole 361. Another through hole 362 proximate to the through hole 361 is downwardly passed into an air release channel 37 concealed in the lower casing 30, and an air release opening 371 (as shown in FIG. 13) formed at the rear of the air release channel 37 is situated at a position corresponsive to the air release silencing barrel 226 of the base 20. In the formation of the third channel 34, it is necessary to drill a plurality of openings communicated to the outside, and plug each of the openings with a plug member 344 to achieve the airtight effect, or an over-pressure release valve 345 (as shown in FIG. 11) is installed at a selected port and provided for locking and connection in order to reduce the pressure at appropriate time. However, the over-pressure release valve 345 is an optional component which is not absolutely required. In the formation process of the fourth channel 36, it is necessary to drill a plurality of openings communicated to the outside, and each of the openings is plugged with a plug member 363 to achieve the airtight effect. In the formation process of the air release channel 37, it is necessary to drill a plurality of openings communicated to the outside, and each of the openings is plugged with a plug member 372 to achieve the airtight effect. A connecting base 38 is formed at the bottom of the lower casing 30 and has a range covering the installing perforation 32 and an air outlet hole 39. A non-penetrating slightly concave groove 310 is formed on the top of the lower casing 30 and between the air release channels 37 and disposed at a position proximate to the rear side for plugging in an air-sealing gasket 3101 (as shown in FIGS. 3, 4 and 13). During the assembling process, the lower casing 30 is attached to the bottom of the base 20, so that the bottom area 23 of the base 20 is completely attached to the lower casing 30. Now, the installing through slot 224 of the base 20 is attached to the installing perforation 32 of the lower casing 30, so that the long locking member 121 passing through the installing through slot 224 is further passed through the installing perforation 32. The air intake tank 225 is attached to the air outlet hole 39, and the air release silencing barrel 226 precisely encloses and covers the exposed air release channel 37 and air release opening 371. In the meantime, the bottom edge of the oxygen storage tank 228 of the base 20 abuts the air-sealing gasket 3101 of the slightly concave groove 310, so that the bottom of the oxygen storage tank 228 achieves the airtight effect. The engaging member 111 passing through the installing perforation 31 of the lower casing 30 may be passed into the engaging hole 232 formed in the bottom area 23 of the base 20 to achieve the locking and connecting effects. Now, the upper casing 10, the base 20 and the lower casing 30 are assembled in the preliminary steps and provided to be installed to the molecule tube 90. The molecule tube 90 is a replaceable consumable filled with a molecular sieve material, so that the interior of the molecule tube 90 has an irreversible directionality of counterflow. The molecule tube 90 as shown in FIGS. 3, 4 and 14 is a longitudinal cylindrical body, and the upper and lower ends are tapered to form upper and lower plugs 91, 92 of the airtight plastic strips 911, 921 embedded into the external periphery respectively. The upper plug 91 is formed at the middle of the exterior of an upper casing 93, and an airtight plastic strip 931 is embedded into the external periphery of the upper casing 93 for securely latched to the top of the molecule tube 90 to provide an airtight effect. An upper casing filter fabric 932 is disposed in the molecule tube 90 and at a position with a small distance from the bottom of the upper casing 93, and an umbrella shaped non-return rubber plate 933 is inserted into the middle of the upper casing 93 and disposed in a range corresponsive to the upper plug 91. A passage 934 penetrating from top to bottom is formed nearby, but the passage 934 falls within the range of the umbrella shaped non-return rubber plate 933. The upper casing 93 further has an air re-supplying passage 935 (as shown in FIG. 14) penetrated from top to bottom and disposed within the range of the upper plug 91. The molecule tube 90 has a partition plate 94 installed at a position proximate to the middle section and an airtight plastic strip 941 embedded into the external periphery of the partition plate 94 for securely latching into the molecule tube 90 to achieve the airtight effect. The partition plate 94 is provided for the supporting purpose to enhance the strength of the molecule tube 90, so that the partition plate 84 itself has a flow channel 942 for passing a gas, The top of the partition plate 94 has an elastic member 943 (such as a volute spring), and a partition plate filter fabric 944 transversally disposed at a position with a small distance from the bottom of the partition plate 94. The lower plug 92 is formed at the middle of the exterior of a lower casing 95, and an airtight plastic strip 951 is embedded into the external periphery of the lower casing 95 for securely latching the bottom of the molecule tube 90 to achieve the airtight effect. The lower casing 95 itself has a flow channel 952 for passing a gas, and a lower casing filter fabric 953 transversally disposed at a position with a small distance from the top of the lower casing 95. A molecular sieve material is filled into a space between the lower casing filter fabric 953 and the partition plate filter fabric 944. During an assembling process as shown in FIG. 13, the upper plug 91 at the top of the molecule tube 90 is passed through one of the large perforations 211 formed the top area 21 of the base 20 and precisely plugged into the engaging slot 132 of the upper casing 10, a force is slightly applied to push the bottom of the molecule tube 90 into a large perforation 231 corresponsive to the bottom area 23 of the base 20, and the lower plug 92 at the bottom is precisely aligned and plugged into the engaging slot 332 of the lower casing 30. Upon completion, the upper plug 91 at the top of the molecule tube 90 achieves the airtight effect with the engaging slot 132 by the airtight plastic strip 911. The external edge of the top of the molecule tube 90 abuts the air-sealing gasket 131 to achieve the airtight effect with the large circular seat 13, the lower plug 92 at the bottom of the molecule tube 90 achieves the airtight effect with the engaging slot 332 by the airtight plastic strip 921, and the external edge of the bottom of the molecule tube 90 abuts the air-sealing gasket 331 to achieves the airtight effect with the large circular seat 33.

The air pump 40 is installed and mounted onto the lower casing 30, and the air pump 40 comprises a connecting base 41 corresponsive to the connecting base 38 of the lower casing 30. The connecting base 41 has a locking hole 42 and an air inlet hole 43 formed therein. When the connecting base 38 of the lower casing 30 is embedded into the connecting base 41 of the air pump 40, the locking hole 42 is attached to the installing perforation 32 formed in the connecting base 38 at the bottom of the lower casing 30. After the long locking member 121 (such as a long bolt) is passed through the installing perforation 12 of the upper casing 10, the installing through slot 224 of the base 20 and the installing perforation 32 of the lower casing 30, the long locking member 121 reaches the locking hole 42 and achieves the locking connection (such as a screw connection) with the locking hole 42. In the meantime, the air inlet hole 43 is attached to the air outlet hole 39 in the connecting base 38 at the bottom of the lower casing 30, and the air outlet hole 39 is configured to be corresponsive to the air intake tank 225 of the base 20 and the air inlet hole 16 of the upper casing 10. Each of both sides of the air pump 40 is inserted into the engaging base 35 of the lower casing 30 through an air outlet tube 44 and interconnected to the through hole 343. The air pump 40 is driven by a motor to operate a cam and suck the air (which is sucked through the air inlet hole 16 and remained in the air intake tank 225) through the air inlet hole 43 and the air outlet hole 39, so that the air may be resupplied into the air intake tank 225 anytime and provided for suction anytime. After the air pump 40 sucks the air, the air is compressed by the operation of the cam, and air pressure is sent to the air outlet tubes 44 on both sides in the sequence of not delivering the air at the same time. The air passes through the engaging base 35 and enters into the third channel 34 from the through hole 343, and finally reaches the through hole 342. In FIGS. 4, 12 and 13, two engaging holes 511 (such as screw holes) formed along the vertical line of the center line are coupled to the through hole 342 and the through hole 341 for installing a gas intake solenoid valve 51. When the gas intake solenoid valve 51 is opened and operated, the gas in the through hole 342 is transferred from the gas intake solenoid valve 51 into the through hole 341, and discharged upwardly from the exit 3321. When the operation of the gas intake solenoid valve 51 stops, the gas will not flow through the through hole 342 or the through hole 341 (Now, the air outlet tube 44 on that side also stops delivering high-pressure gas, and the high-pressure gas is delivered by the air outlet tube 44 on the other side instead), and the high-pressure gas at the exit 3321 enters into the fourth channel 36 from the through hole 341 and reaches the through hole 361. In FIGS. 4, 12 and 13, two engaging holes 521 (such as screw holes) formed along the vertical line of the center line are coupled to the through hole 361 and the through hole 362 for installing an air release solenoid valve 52. When the air release solenoid valve 52 is opened and operated, the gas in the through hole 361 is transferred into the through hole 362 from the air release solenoid valve 52 and connected to the air release channel 37, and the gas is discharged from the air release opening 371 into the air release silencing barrel 226 on the base 20, to achieve the effects of buffering the high-pressure gas, reducing the pressure, and silencing the noise.

When the assembly of the present invention is used, and the air pump 40 is turned on, air in the air intake tank 225 is sucked through the air inlet hole 43 and the air outlet hole 39, and then compressed and driven by the cam. The high-pressure air is delivered alternately to the air outlet tubes 44 on both sides, and then passed through the engaging base 35 on a side and entered from the through hole 343 into the third channel 34 to reach the through hole 342. Now, the gas intake solenoid valve 51 on that side has been opened already for transferring the high-pressure gas to the through hole 341 and connecting the gas to the exit 3321. The high-pressure gas is further passed through the lower plug 92 at the bottom of the molecule tube 90 on that side and entered into the molecule tube 90. After the high-pressure gas is passed through the molecular sieve material filled in the molecule tube 90, high-pressure pure oxygen is generated to prop and lift the umbrella shaped non-return rubber plate 933 (which is capable of stopping the flow in an opposite direction), enters into the exit 1321 of the side engaging slot 132 through the upper plug 91, and then flows through the first channel 133 to reach the air inlet 1331. The high-pressure pure oxygen flows downwardly through the through hole 2281 and enters into the longitudinal channel 2282, and finally flows along the transverse channel 2283 into the oxygen storage tank 228 for storage.

During the oxygen generation process taking place in the molecule tube 90, most of the gases not passing through the molecular sieve material is nitrogen gas, and the nitrogen gas remains at the lower section of the molecule tube 90. When the set oxygen generation time is up, the operation of the side gas intake solenoid valve 51 will stop (since heat is generated in the oxygen generation process, therefore it is necessary to stop the operation after a certain period of time), so that the high-pressure gas remains in the through hole 342 or reaches the through hole 361 through the fourth channel 36. According to the setup, the side air release solenoid valve 52 is opened and operated immediately to transfer the remaining high-pressure gas to the through hole 362 when the operation of the side gas intake solenoid valve 51 stops. The remaining high-pressure gas is discharged from the air release channel 37 and the air release opening 371 into the air release silencing barrel 226 of the base 20.

When the oxygen generation on a side (such as the first side) stops, the high-pressure gas is sent to the air outlet tube 44 on the other side (such as the second side) and passed through the engaging base 35 on the side (second side) to enter from the through hole 343 into the third channel 34 on the side (second side) and reaches the through hole 342 on the side (second side). Now, the gas intake solenoid valve 51 on the side (second side) has been opened already, so that the high-pressure gas is transferred to the through hole 341 on the side (second side) immediately and passed to the exit 3321. The high-pressure gas enters from the lower plug 92 at the bottom of the molecule tube 90 on the side (second side) into the molecule tube 90, and then the high-pressure gas is passed through the molecular sieve material filled in the molecule tube 90 to generate high-pressure pure oxygen which will lift the umbrella shaped non-return rubber plate 933 on the side (second side) and stop when the high-pressure pure oxygen flows in an opposite direction. The high-pressure pure oxygen enters from the upper plug 91 on the side (second side) into the exit 1321 of the engaging slot 132 on the side (second side), and then passes through the first channel 133 on the side (second side) to reach the air inlet 1331 flows downwardly from the through hole 2281 on the side (second side) into the longitudinal channel 2282 on the side (second side) and then along the same transverse channel 2283 into the oxygen storage tank 228 for storage. When the oxygen generation on the second side stops, the remaining high-pressure gas is discharged similarly by the discharging method. During the process of generating oxygen alternately, the quantity and concentration of the pure oxygen in the oxygen storage tank 228 become increasingly greater.

Before the oxygen generation on the first side stops, the oxygen generation on the second side has not been turned on, so that there will be no oxygen at the top inside the molecule tube 90 on the second side. To avoid the situation of having no oxygen supply in a small time interval during the process of switching the oxygen generation on both sides, it is necessary to resupply a trace of oxygen into the molecule tube 90 on the second side when oxygen is generated on the first side. In other words, the oxygen re-supplying solenoid valve 70 is opened at an appropriate time while oxygen is being generated on the first side (or the second side), and a trace of oxygen generated from the first side (or the second side) is passed from the through hole 1342 of the first side through the oxygen re-supplying solenoid valve 70, transferred into the through hole 1342 of the second side (or the first side) and then passed through the exit 1341 on the second side (or the first side) and the air re-supplying passage 935 to enter into the molecule tube 90 on the second side (or the first side) and remain there. When the oxygen generation starts, a portion of the oxygen is available for output. In the oxygen generation process, the supply of oxygen on two different sides has a complementing effect.

When the oxygen generator is used, it is necessary to connect a tube joint of an external oxygen tube (not shown in the figure) to the locking slot 15 to achieve an airtight effect. The oxygen output regulating valve 60 is opened from the through hole 2271 to let the high-pressure oxygen in the oxygen storage tank 228 pass through the flow channel of the oxygen output regulating valve 60 and flow upwardly into the installation space 227. When the oxygen output regulating valve 60 is opened, the adjusting knob may be turned to adjust the flow rate of the oxygen output regulating valve 60, and the oxygen output solenoid valve 80 is opened to transfer the oxygen remained in the installation space 227 into the through hole 152 through the through hole 144 and then from the airway 151 into the locking slot 15, so that the external oxygen tube may be used for sucking oxygen from the locking slot 15 continuously, to supply fresh oxygen anytime.

In summation of the description above, the present invention generates oxygen from the molecule tubes 90 on both sides alternately to increase the amount of oxygen in the oxygen storage tank 228 and supply a large quantity of high-pressure oxygen for use anytime. The structural assembly and application of the present invention obviously have the following improvements and effects:

1. The base 20 is an integrally formed object (by aluminum extrusion) having a perspective structure of large openings formed on both sides of the base 20, so that users may see the molecule tube 90 anytime to facilitate the users passing the molecule tube 90 into or out from the upper casing 10 and the lower casing 30 and make the connection, assembling or replacement more convenient.

2. The molecule tube 90 is a replaceable consumable filled with the molecular sieve material, so that the replacement can be made conveniently anytime. No complicated assembling or removal is required for the replacement, and the application is much more convenient than the conventional oxygen generators.

3. The overall structural assembly of the present invention is solid, refined, and light, so that the oxygen generator of the present invention is easy to carry and transport.

In summation of the description above, the present invention achieves the expected effects. While the invention has been described by means of specific embodiments, numerous modifications and variations could be made thereto by those skilled in the art without departing from the scope and spirit of the invention set forth in the claims.

What is claimed is:

1. An oxygen generator comprising:
an upper casing having a plurality of first installing perforations formed around a periphery of the upper casing and for passing a corresponding quantity of engaging members respectively;
a second installing perforation disposed in the upper casing for passing a long locking member;
two large circular seats disposed in the upper casing and each having a bottom edge coupled to an air-sealing gasket, with each large circular seat disposed in the upper casing having an engaging slot formed therein, with an upwardly oriented exit inwardly communicated with a first channel, wherein when the first channel is communicated with the upper casing, an air inlet is passed downwardly to outside;
a concave circular groove formed in the upper casing and disposed between the two large circular seats disposed in the upper casing and for plugging an air-sealing gasket therein, with the concave circular groove having a first through hole and a first airway upwardly passing out from the first through hole and backwardly extending and passing out from a second through hole;
a locking slot formed in the upper casing and downwardly penetrating into a depth and passing out from a second airway and then backwardly extended out from a third through hole;
an air inlet hole formed through the upper casing;
an oxygen output solenoid valve installed on the upper casing, and disposed between the third through hole communicated with the second through hole formed at the concave circular groove of the upper casing and the second through hole communicated with the locking slot, wherein when the oxygen output solenoid valve is opened, the second through hole communicated with the third through hole formed at the concave circular groove of the upper casing is interconnected to the second through hole communicated with the locking slot;
a base having a top area and a bottom area, with a plurality of first large perforations formed in the top area, with a center of the plurality of first large perforations corresponsive to a center of the engaging slot, with a plurality of second large perforations formed in the bottom area, with a center of the plurality of second large perforations corresponsive to the center of the engaging slot, with a location between the top area and the bottom area and corresponsive to the plurality of first and second large perforations and a portion of a periphery of the base being a large opening, with only the location between the plurality of large perforations coupled by a front wall, a rear wall and a middle connecting column, with a periphery of the top area having a first engaging hole configured to be corresponsive to the plurality of first installing perforations of the upper casing for passing and securing a corresponding engaging member of the upper casing into the first engaging hole when the upper casing covers the top area, with a periphery of the bottom area having a second engaging hole, with the middle connecting column having an installing through slot formed and longitudinally penetrated through the middle connecting column;
an air intake tank, an air release silencing barrel and an installation space divided into an upper position and a lower position, and an oxygen storage tank, wherein the installing through slot is provided for passing the long locking member of the upper casing; wherein the air intake tank is configured to be corresponsive to the air inlet hole; wherein the air release silencing barrel is provided for discharging and buffering air therein; wherein the installation space is opened upwardly and has a fourth through hole penetrated through the rear wall; wherein the oxygen storage tank is opened downwardly, wherein the oxygen storage tank is blocked and sealed by an oxygen output regulating valve, wherein oxygen is outputted from the oxygen output regulating valve; wherein the top area has a sixth through hole configured to be corresponsive to a position of the air inlet of the upper casing and penetrated downwardly into the rear wall, wherein the sixth through hole is a longitudinal channel communicated with a transverse channel and passed into the oxygen storage tank; wherein the oxygen output regulating valve is attached into the installation space, with an adjusting knob aligned precisely and passed through the fourth through hole;
a lower casing having a plurality of third installing perforations formed around a periphery of the lower casing for passing an equal amount of engaging members one by one respectively and having a fourth installing perforation formed at a position proximate to a middle of the lower casing for passing the long locking member;

two large circular seats disposed at the lower casing and coupled to air-sealing gaskets, with each large circular seat disposed in the lower casing having an engaging slot formed therein and a downwardly formed exit communicated with a downwardly formed through hole, with the downwardly formed through hole having a third channel communicated with the downwardly formed through hole, with one downwardly formed through hole extended to a side of the lower casing and communicated with a downwardly extended engaging base; with another downwardly formed through hole passing out from the engaging slot and interconnecting a fourth channel and passing out from a further through hole, with an additional through hole passing through the fourth channel having a still further through hole passed into an air release channel, with an air release opening formed at a rear of the air release channel being corresponsive to an air release silencing barrel of the base; a connecting base being formed at a bottom of the lower casing and covering the fourth installing perforation and an air outlet hole; with a top of the lower casing having a non-penetrating concave groove formed between the air release channel and plugging the air-sealing gasket; with the lower casing attached onto a bottom area of the base, with the fourth installing perforation of the lower casing attached to the installing through slot of the base, wherein the long locking member passing through the installing through slot passes through the fourth installing perforation of the lower casing; with the air outlet hole of the lower casing attached to the air intake tank; with the air release silencing barrel of the base enclosing and covering the air release channel and the air release opening exposed from the lower casing; with the oxygen storage tank of the base abutting the air-sealing gasket in the non-penetrating concave groove, wherein the oxygen storage tank is air-tightly sealed; with each engaging member passing into the third installing perforation of the lower casing installed and secured into the second engaging hole of the bottom area of the base;

an air pump having a connecting base configured to be corresponsive to the connecting base of the lower casing, with the connecting base of the air pump having a locking hole and an air inlet hole formed therein, wherein when the connecting base of the lower casing is embedded into the connecting base of the air pump, the locking hole is attached to the fourth installing perforation in the connecting base of the lower casing for passing and securing the long locking member that passes through the fourth installing perforation of the lower casing; with the air inlet hole attached to the air outlet hole formed in the connecting base of the lower casing; with each side of the air pump inserted from an air outlet tube into the engaging base of the lower casing and communicated with the other of the downwardly formed through hole; with the air pump sucking air through the air inlet hole and the air outlet hole and entering the air from the air inlet hole into the air intake tank by driving a cam by a motor, with the cam operated to compress the air, with air pressure sent sequentially at different times to the air outlet tubes and through the engaging base, and entering from the other of the downwardly formed through hole into the third channel of the lower casing;

a gas intake solenoid valve installed at the lower casing and disposed between the one downwardly formed through hole downwardly passing through the third channel and the other downwardly formed through hole downwardly passing out from the engaging slot of the lower casing, wherein when the air pump is turned on, the one downwardly formed through hole downwardly passing out from the third channel is communicated with the other downwardly formed through hole downwardly passing out from the engaging slot of the lower casing, wherein high-pressure air rushes upwardly out from an exit communicated with the engaging slot;

an air release solenoid valve installed at the lower casing and disposed between the fourth channel and the air release channel, wherein when the gas intake solenoid valve is closed, high-pressure gas at the exit of the engaging slot downwardly passes out from the other downwardly formed through hole to enter into the fourth channel and reach the further through hole, wherein when the air release solenoid valve is opened, the gas in the fourth channel is transferred into the air release channel and discharged from air release opening into the air release silencing barrel of the base; and first and second molecule tubes each being a longitudinal cylindrical body filled with a molecular sieve material and having an upper casing portion and a lower casing portion, with an airtight plastic strip embedded into an external periphery of each of the upper casing portion and the lower casing portion for sealing air when the airtight plastic strip is latched securely to a top and a bottom of the molecule tube; with an exterior of the upper casing portion being tapered to form an upper plug, with the airtight plastic strip embedded into the upper plug, with the upper casing portion having an umbrella shaped non-return rubber plate inserted into the upper plug, with a passage formed within a range covering the umbrella shaped non-return rubber plate and penetrated through the upper casing portion; with the lower casing being tapered to form a lower plug with the airtight plastic strip embedded into the lower plug, with the upper plug of the molecule tube passing through one of the plurality of third large perforations of the base and precisely aligned and plugged into a corresponding engaging slot of the upper casing, with the molecule tube being pushed into the second large perforation corresponsive to the bottom area of the base, with the lower plug being precisely aligned and plugged into a corresponding engaging slot of the lower casing, wherein the upper plug of the molecule tube provides an airtight effect between the airtight plastic strip and the corresponding engaging slot, wherein the molecule tube abuts the air-sealing gasket connected to a corresponding large circular seat of the upper casing to achieve the airtight effect, wherein the lower plug of the molecule tube provides an airtight effect between the airtight plastic strip and the corresponding engaging slot, and wherein the molecule tube abuts the air-sealing gasket connected to a corresponding large circular seat of the lower casing to achieve the airtight effect.

2. The oxygen generator as claimed in claim 1, wherein an exit is formed outside each of the engaging slots of the two large circular seats disposed in the upper casing and communicated to a second channel, wherein the second channel is interconnected to the upper casing and passes backwardly to the outside from an additional through hole, wherein an oxygen re-supplying solenoid valve is installed on the upper casing and disposed between the additional through hole backwardly communicated by the second channel, wherein an air re-supplying passage is formed on the upper casing portion of the molecule tube and corresponsive outside the upper plug and penetrated through the upper casing portion, with the oxygen re-supplying solenoid valve opened, the second channel is communicated with the additional through hole for re-supplying oxygen generated from oxygen generation to the molecule tube in which oxygen has not been generated yet.

3. The oxygen generator as claimed in claim 1, wherein the base is an integrally formed object and having a heat sink outwardly and perpendicularly formed on the base.

4. The oxygen generator as claimed in claim 1, wherein each molecule tube comprises: an upper casing filter fabric transversally disposed inside the upper casing portion and at a position with a distance from the bottom of the upper casing portion; a partition plate installed at the upper casing for flowing a gas and having an airtight plastic strip embedded around the partition plate; an elastic member installed at the partition plate: a partition plate filter fabric transversally disposed at the upper casing; wherein the lower casing portion is provided for passing a gas; and a lower casing filter fabric transversally disposed at the lower casing; with the molecular sieve material filled into a space between the lower casing filter fabric and the partition plate filter fabric.

5. The oxygen generator as claimed in claim 1, wherein when the high-pressure air enters into each molecule tube from the lower plug of the molecule tube, the high-pressure air passes through the molecular sieve material to produce high-pressure pure oxygen and flows upwardly to enter into an upwardly oriented exit of the corresponding engaging slot of the upper casing through the upper plug of the molecule tube, and then passes through the first channel to reach the air inlet, and flows downwardly through the sixth through hole to enter into the longitudinal channel, and flows along the transverse channel and into the oxygen storage tank for storage, wherein the gas without passing through the molecular sieve material remains in the lower section inside the molecule tube, and wherein when the oxygen generation stops, the air at a lower section inside the molecule tube is transferred from the fourth channel to the air release channel by the operation of the air release solenoid valve and released from the air release opening into the air release silencing barrel of the base.

6. The oxygen generator as claimed in claim 1, wherein the locking slot is provided for securing a tube joint of an oxygen tube.

7. The oxygen generator as claimed in claim 1, wherein upper and lower ends of the air intake tank are provided for filling a filter member.

8. The oxygen generator as claimed in claim 4, wherein when the high-pressure air enters into each molecule tube from the lower plug of the molecule tube, the high-pressure air passes through the molecular sieve material to produce high-pressure pure oxygen and flows upwardly to enter into an upwardly oriented exit of the corresponding engaging slot of the upper casing through the upper plug of the molecule tube, and then passes through the first channel to reach the air inlet, and flows downwardly through the sixth through hole to enter into the longitudinal channel, and flows along the transverse channel and into the oxygen storage tank for storage, wherein the gas without passing through the molecular sieve material remains in the lower section inside the molecule tube, and wherein when the oxygen generation stops, the air at a lower section inside the molecule tube is transferred from the fourth channel to the air release channel by the operation of the air release solenoid valve and released from the air release opening into the air release silencing barrel of the base.

* * * * *